(12) United States Patent
Ramasamy

(10) Patent No.: US 11,538,082 B2
(45) Date of Patent: Dec. 27, 2022

(54) COMPUTER METHODS AND SYSTEMS FOR FLAT NAVIGATION

(71) Applicant: Zoho Corporation Private Limited, Pleasanton, CA (US)

(72) Inventor: Dev Anand Inbam Ramasamy, Chennai (IN)

(73) Assignee: Zoho Corporation Private Limited, Kanchipuram District (IN)

( * ) Notice: Subject to any disclaimer, the term of this patent is extended or adjusted under 35 U.S.C. 154(b) by 1176 days.

(21) Appl. No.: 14/986,792

(22) Filed: Jan. 4, 2016

(65) Prior Publication Data

US 2016/0203184 A1  Jul. 14, 2016

Related U.S. Application Data

(60) Provisional application No. 62/102,727, filed on Jan. 13, 2015.

(51) Int. Cl.
*G06F 16/954* (2019.01)
*G06Q 30/06* (2012.01)
*G06F 16/951* (2019.01)

(52) U.S. Cl.
CPC ....... *G06Q 30/0623* (2013.01); *G06F 16/951* (2019.01); *G06F 16/954* (2019.01)

(58) Field of Classification Search
CPC ......... G06F 17/30873; G06F 17/30864; G06F 17/30; G06F 16/951; G06F 16/954; G06Q 30/0623; H04L 67/02

USPC .......................................................... 707/722
See application file for complete search history.

(56) References Cited

U.S. PATENT DOCUMENTS

| | | | |
|---|---|---|---|
| 2007/0094267 A1* | 4/2007 | Good | G06F 16/954 |
| 2010/0162174 A1* | 6/2010 | Karidi | G06F 3/048 |
| | | | 715/854 |
| 2011/0307839 A1* | 12/2011 | Liao | G06F 3/0481 |
| | | | 715/854 |
| 2014/0258844 A1 | 9/2014 | Liao et al. | |

OTHER PUBLICATIONS

Various contributors, Website, (Wikipedia, Creative Commons), web page printout, retrieved Nov. 4, 2014.

* cited by examiner

*Primary Examiner* — Hosain T Alam
*Assistant Examiner* — Tracy M McGhee
(74) *Attorney, Agent, or Firm* — Arthur Behiel; Mark Lauer; Silicone Edge Law Group LLP

(57) ABSTRACT

Computer-implemented methods and systems for flat navigation allow users to quickly step directly among lower level webpage item-details of higher level item search results. A user thereby avoids navigating a cumbersome webpage hierarchy. Item details are received from one or more static and real-time resources. The user may navigate among item-detail webpages by using a touch screen, touch pad, key, mouse, or voice commands.

12 Claims, 9 Drawing Sheets

VM Manager Plus

Windows (eight Items 105)

Welcome admin
22 Aug 2014 11:31:48 AM PST

Type here to search

Inventory

All Devices (26)
All Interfaces (0)

Sort by Category

Sort By Type

Unknown (12)
Windows (8)
ESXServer (2)
HyperVServer (2)
XenServer (2)

Sort By Subnets

| | Device Name | Status | IP Address | Device Type | Category | Interfaces |
|---|---|---|---|---|---|---|
| 1 | sprasad-w7 | ! Attention | 172.18.11.98 | Windows | Virtual Device | 0 |
| 2 | opman-k8r2s-64-1 | √ Clear | 172.18.194.186 | Windows | Virtual Device | 0 |
| 3 | OPMAN-K8R2S-64-2 | √ Clear | 172.18.155.78 | Windows | Virtual Device | 0 |
| 4 | Kunal-w2k8-1 | / Unknown | 172.18.95.217 | Windows | Virtual Device | 0 |
| 5 | Suresh-2080 | ! Attention | 172.18.150.68 | Windows | Virtual Device | 0 |
| 6 | Regoe-w2k8-1 | ! Attention | 172.18.94.74 | Windows | Virtual Device | 0 |
| 7 | opman-k8r2s-64-4 | √ Clear | 172.18.10.166 | Windows | Virtual Device | 0 |
| 8 | raamesh-m11-64-2 | √ Clear | 172.18.194.208 | Windows | Virtual Device | 0 |

|< << | Page 1 of 1 | >> >| 1000

View 1 - 8 of 8

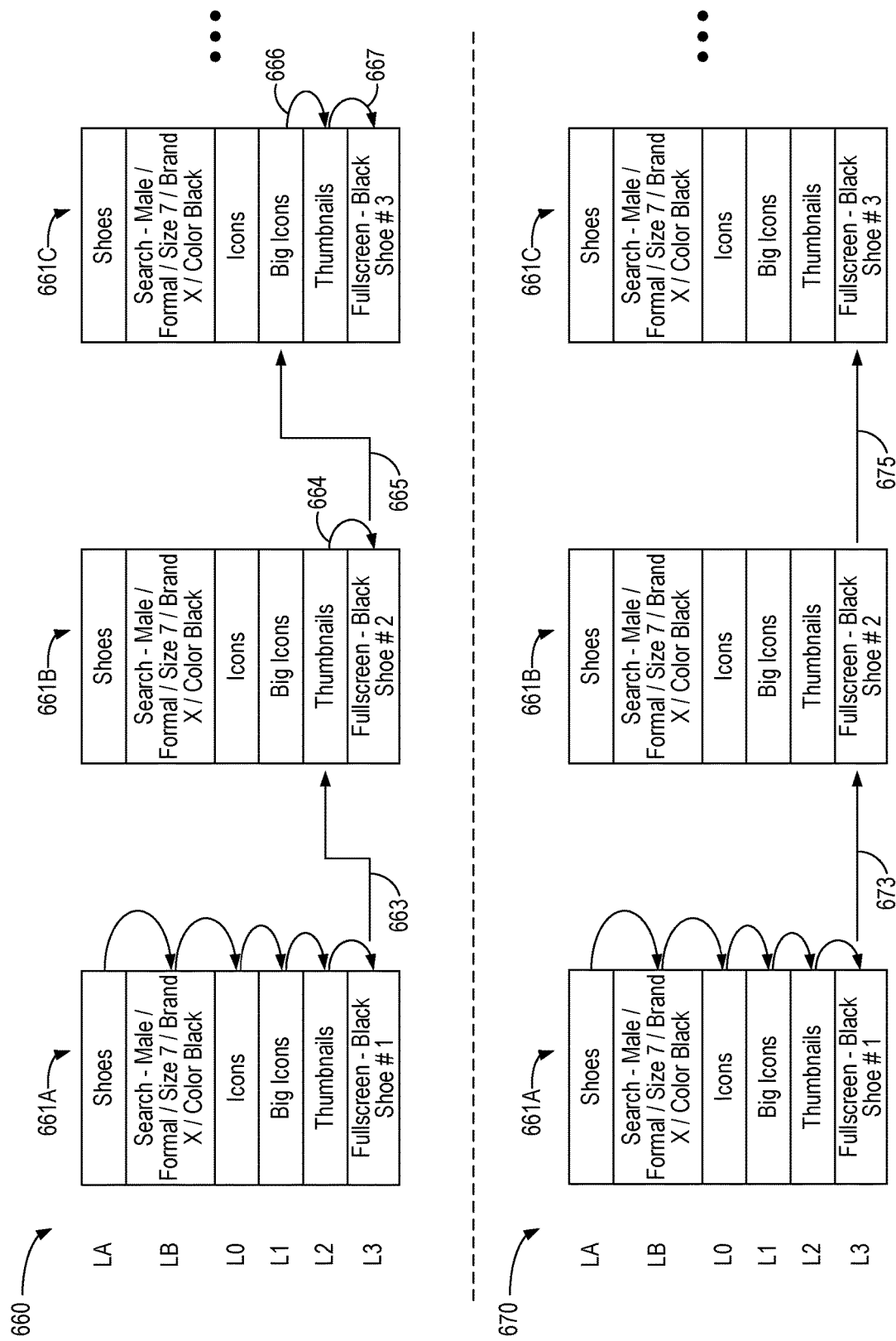

COMPUTER METHODS AND SYSTEMS FOR FLAT NAVIGATION

FIELD OF THE INVENTION

The present invention generally relates to methods and systems for Website navigation.

BACKGROUND

Websites support hierarchical webpage structures where lower-level webpages provide details for items in higher-level webpages. In current websites when a user is at a lower-level webpage viewing details of an item and desires to view details of another item, the website requires the user to navigate back to the higher level, select the next item of interest, and navigate again to a lower level before moving to the next detail of interest. Such circuitous paths can be irritating and time consuming.

BRIEF DESCRIPTION OF THE DRAWINGS

The subject matter presented herein is illustrated by way of example, and not by way of limitation, in the figures of the accompanying drawings and in which like reference numerals refer to similar elements and in which:

FIG. 3 depicts a webpage showing a view resulting from a user selecting an item from the inventory list of FIG. 1 in accordance with one embodiment;

FIG. 4 depicts a search webpage showing a view resulting from a user querying for an item in accordance with one embodiment;

FIGS. 6 and 6A graphically depict an exemplary data structure that can be used in accordance with the embodiments of FIGS. 1-5, and advantages relating to the embodiments;

DETAILED DESCRIPTION

Figure 1:
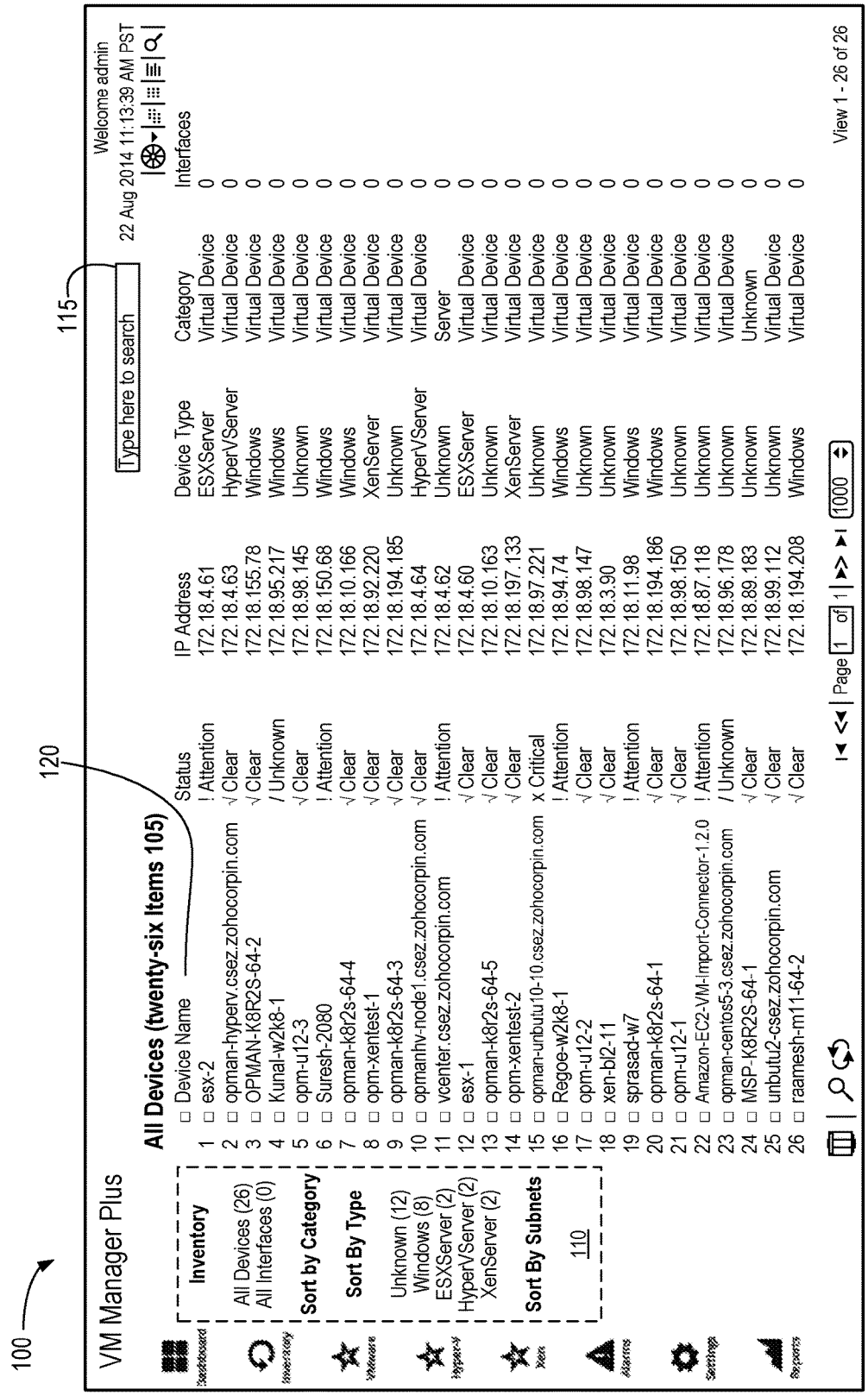
FIG. 1 depicts a directory webpage listing a series of items referenced by item-data resources in accordance with one embodiment.

FIG. 1 depicts a directory webpage 100 listing a series of twenty-six items 105, network devices in this example. Directory webpage 100 is presented using a conventional computer (e.g., laptop, desktop, tablet, or smartphone) connected to a network (e.g., a local- or wide-area network) that provides access to one or more databases that maintain a collection of item-data resources. Each item-data resource references one of items 105 and includes information pertinent thereto. For example, the uppermost item 105 is a virtual device named esx-2, and the underlying database includes an item-data resource that includes e.g. a status flag and IP address for that item.

Directory 100, via the computer presenting its webpage, also provides access to a collection of item-detail resources, each item-detail resource including an item variable specific to a corresponding one of items 105. Selecting one of devices 105, such as via a mouse click, initiates a call to the corresponding item-detail resource, which is then presented to the user as another webpage over or in lieu of webpage 100. User input/action such as "select" may be achieved differently in a touch-screen interface (e.g. tap or swipe with a finger or stylus), keyboard interface (e.g. key strokes and key combinations), or by voice command.

Figure 2:
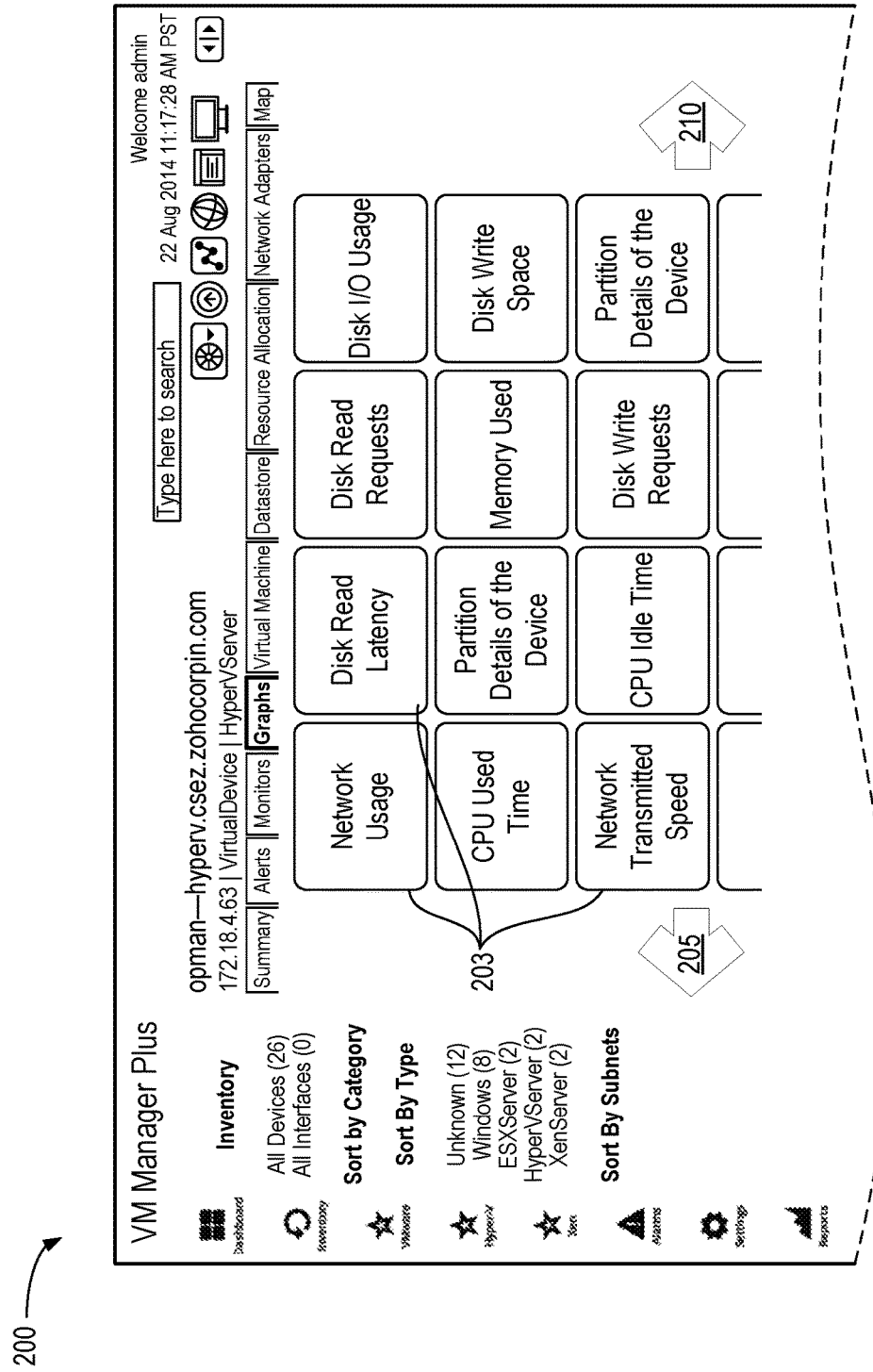
FIG. 2 depicts an item-detail webpage referencing an item-data resource in accordance with one embodiment.

FIG. 2 depicts an item-detail webpage 200 that references the item-detail resource specific to the item 105 called "opman-hyperv.csez.zohocorpin.com". Webpage 200 can be called up by selecting the second listed item 105 of webpage 100 of FIG. 1. Webpage 200 has a number of icons or tabs 203 that can be selected to depict item-specific variables, such as network usage, disk read latency, etc., that may be of interest to a user analyzing or troubleshooting items 105.

In conventional systems, a user interested in the same item-specific variable for another of items 105 would have to navigate back to webpage 100 to find the next device for which the variable is of interest. Webpage 200 simplifies this task by providing icons 205 and 210 that allow the user to navigate directly to an item-detail webpage similar to webpage 200 for the next item of interest. This process will be detailed further below. The functionality provided by icons 205 and 210 can be provided by e.g. key strokes, finger swipes on a touch screen interface, or voice commands, instead of or in addition to icons 205 and 210.

Systems with large numbers of items can be cumbersome to navigate. Returning to FIG. 1, webpage 100 includes a number of mechanisms for receiving search queries that allow the user to limit his or her item selection to a filtered set. For example, an area 110 includes an inventory list that categorizes the listed devices by type, which refers to operating systems in this example. The inventory may be presented to the user by voice, e.g., synthesized or pre-recorded voice, in another embodiment. Selecting one of the groups in area 110 limits the listed items to the ones of the selected type. FIG. 3 is a webpage 300 depicting a result view when the user selects "Windows" (e.g., via a mouse click) in area 110 of FIG. 1. The type icon used to make such a selection is labeled 305 in FIG. 3.

Figure 4:
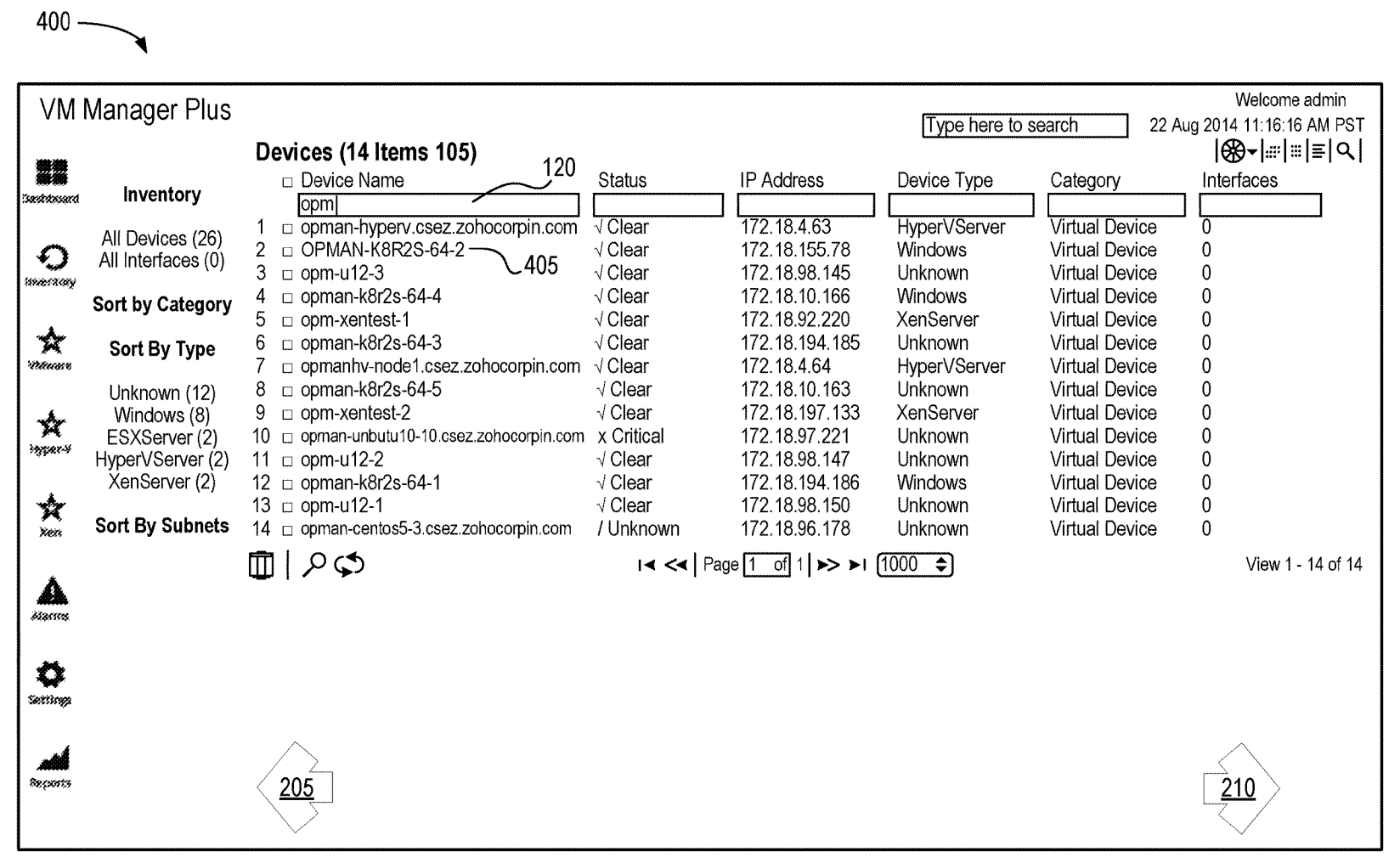

Returning again to FIG. 1, one can also enter a search string by selecting device-name field 120 and entering a character string. One may also speak one or more words or phrases to make a selection in another embodiment. FIG. 4 is a search webpage 400 depicting a result view when the user places a cursor in field 120 and types the item query, the character string "opm" in this example, in field 120 of FIG. 1. As it happens, fourteen device names begin with this string, and a filtered subset of fourteen items is thus included in the results view of webpage 400.

As in the example of FIG. 2, a user can call up an item-detail webpage by selecting (e.g., clicking on) a field that identifies one of items 105. In this example, a user clicks on field 405 to call up an item-detail resource specific to the item 105 called "OPMAN-K8R25-64-2."

Figure 5:
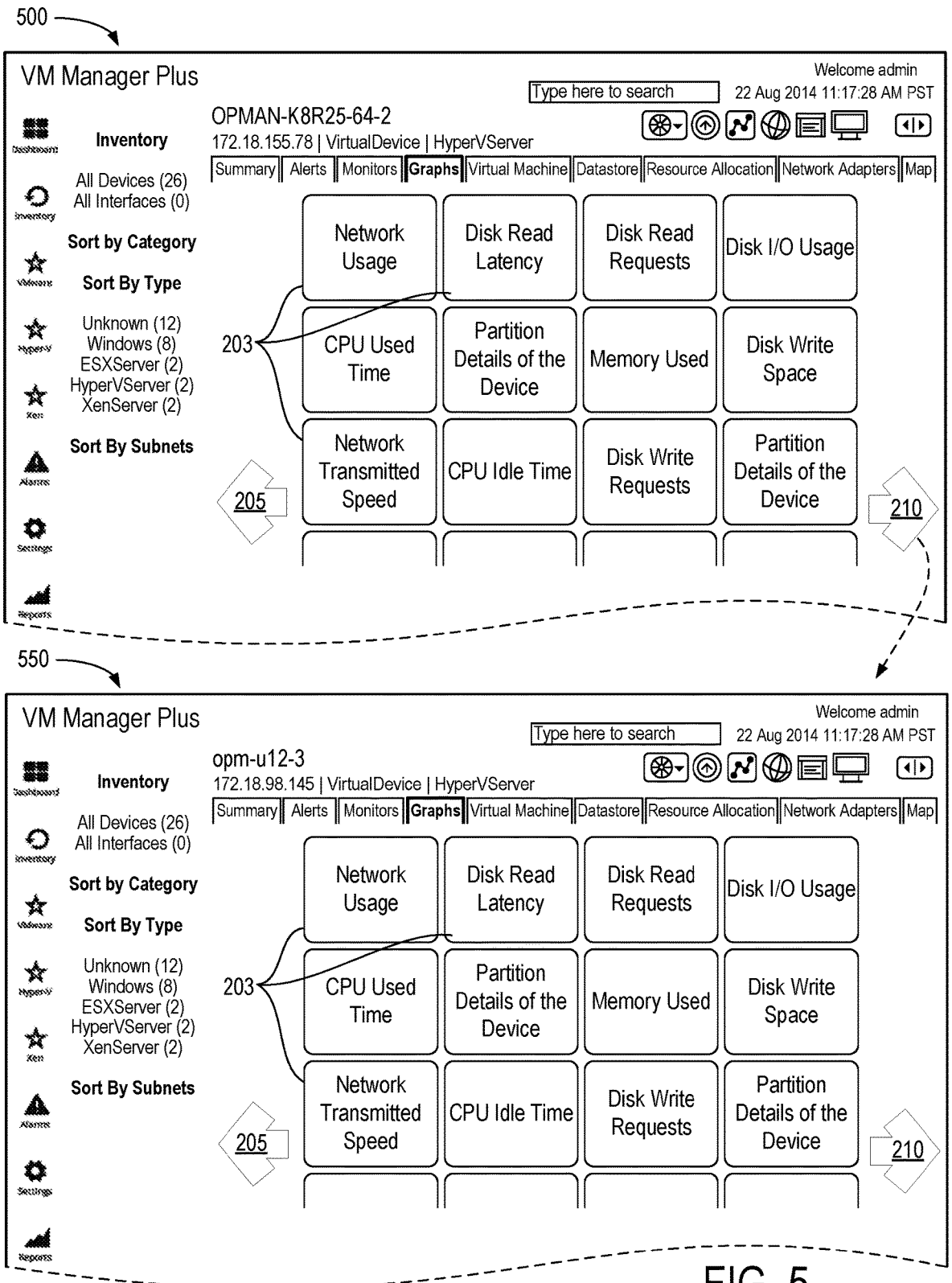
FIG. 5 depicts webpages 500 and 550 corresponding to item-detail views of item-resources between which a user may step in accordance with one embodiment.

FIG. 5 depicts webpages 500 and 550 corresponding to the item-specific resources for items OPMAN-K8R25-64-2 and opm-u12-3 of FIG. 4 (e.g., webpage 500 corresponds to the Level 1 node OPMAN-K8R25-64-2, and webpage 550 to the Level 1 node opm-u12-3). Both webpages 500 and 550 show Level 2 nodes corresponding to the tabs: Summary, Alerts, Monitors, Graphs, Virtual Machine, Datastore, Resource Allocation, Network Adapters, and Map. The "Graph" Level 2 nodes are selected, which show detail graphs such as network usage, Disk Read Latency, etc.

Webpage 500 is similar to webpage 200 of FIG. 2, but the item-specific variables are different. For example, the reported network usage is likely to be different between the two devices. Suppose a network administrator is interested in looking at the network-usage variable for the items 105 listed in the results view of FIG. 4. Having viewed the network-usage window in webpage 500, the administrator might proceed to the next item 105 in the list, a device opm-u12-3 in this example. The administrator could use the "back" button to return to the results view of FIG. 4 and select the next item 105 in the list. This process is relatively cumbersome, however, particularly if there are many items to consider. The item-specific webpage 200 thus includes icons 205 and 210, introduced in FIG. 2, that allow the user to navigate directly to an item-detail webpage similar to webpage 200 for the next item 105 in the list of FIG. 4. The user can thus quickly step through the item-detail views of the search results. In the example of FIG. 5, selecting arrow 210 of webpage 500 accesses the item-specific resource for device opm-u12-3 to replace or overlay webpage 500 with a webpage 550 specific to device opm-u12-3. Selecting arrow 205 reverses this process to once again present the user with webpage 500. The user can thus readily move among items 105.

Figure 6:
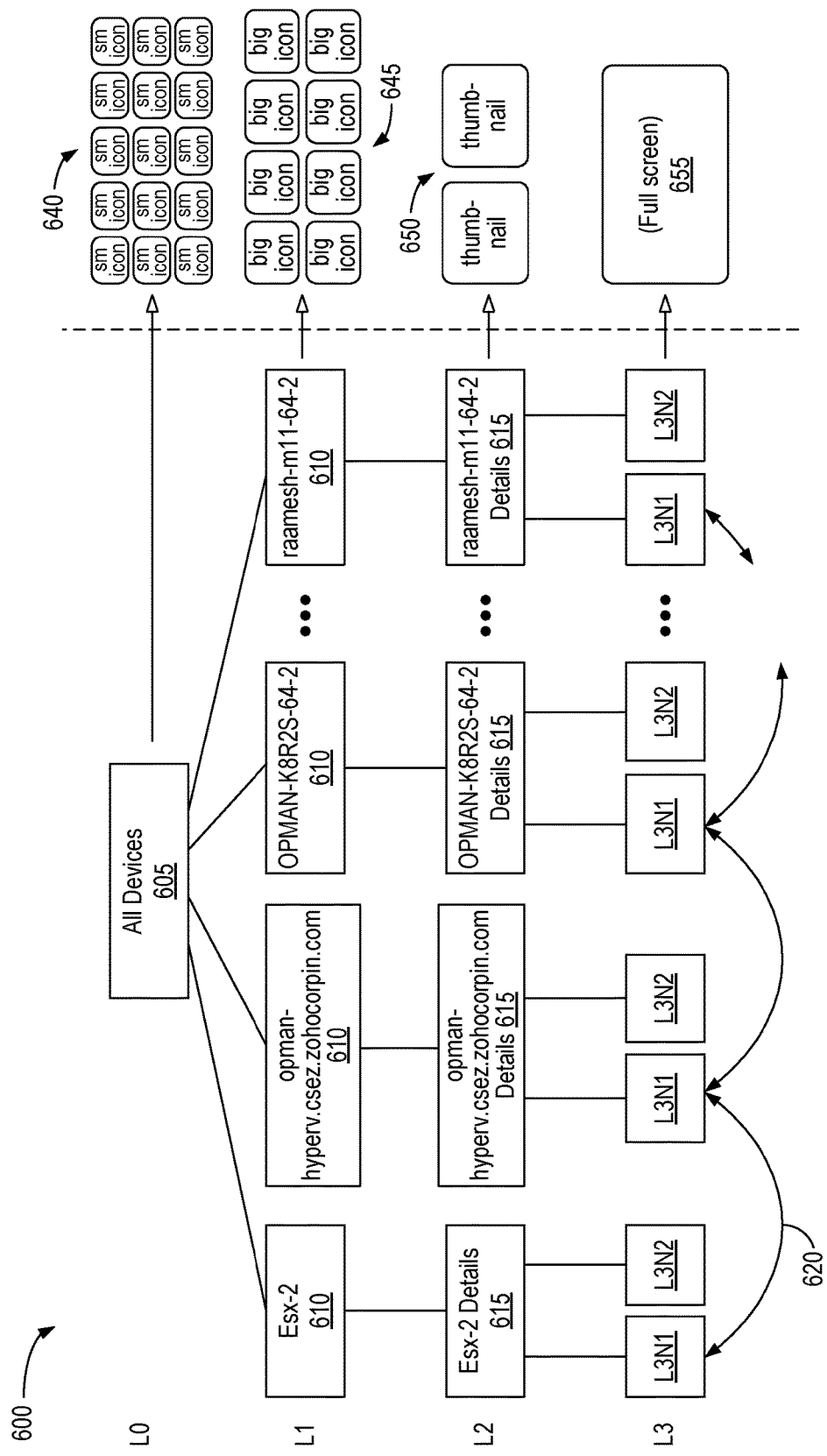

FIG. 6 graphically depicts a data structure 600 that can be used in accordance with the embodiments of FIGS. 1-5. Each node represents a network resource, such as a webpage, that can be called upon to present a view that offers some information to the requesting user. At the top level L0, an all-devices webpage 605 can be selected to obtain the view of FIG. 1, providing the user with a list of available devices. Available devices are presented as small icons 640 in accordance with one embodiment. Webpage 605 includes hyperlinks to item-data resources 610 in the next level L1. Each resource 610 in this collection references one of the devices. Item-data resources are presented as big icons 645 in accordance with one embodiment.

Each item-data resource 610 includes a link to an item-detail resource 615. Each resource 615 in this collection includes some item-specific variable. Webpages 500 and 550 are examples of views rendered from item-detail resources 615, which are hypertext documents in this embodiment.

Additional nodes and levels can of course be provided. In the example of FIG. 6, a third level L3 includes two nodes L3N1 and L3N2 for each item-detail resource 615 of level L2, and are, in another embodiment, presented as thumbnails 650. A user can navigate between adjacent resources in the same level, or between like resources in the same level (e.g., between nodes L3N1, as indicated using arrows 620). Different icons, keys, or actions can support different types in inter-level and intra-level navigation. In another aspect, like resources at third level nodes L3 are presented in full screen mode 655.

In another embodiment, documents are created dynamically and may include, e.g., a combination of static and real-time item-details received from disparate item-data resources. For example, in a consumer context, item-specific images and specifications may be retrieved from, e.g., one or more a manufacturer or retailer resources, pricing from one or more real-time or quasi real-time resources, e.g., Amazon, Target, Home Depot, or NewEgg, and user reviews may derive from yet other resources, e.g., blogs and "do-it-yourself" message boards. Hypertext links to individual item-data resources used to create a dynamic document may be embedded in the document in another embodiment.

FIGS. 6 and 6A illustrate advantages of the embodiments described herein. A user interested in the types of details available in resources 615 (level 2) need not browse up the hierarchy to arrive at another of resources 615; rather, the user can use e.g. arrow keys or a mouse to move laterally within the second level. Similarly, a user desiring shoe details relating to Black Shoes # 1-3 (level 3) depicted respectively in menus 661A-C of conventional navigation scheme 660, need not, e.g., navigate upward (663), down (664), back up again (665), and down twice (666, 667) to view successive shoe details. Rather, the user directly navigates 673 from Shoe # 1 to # 2, and navigates again 675 to Shoe #3 in accordance with flat navigation scheme 670. This "flat navigation" streamlines many tasks, advantageously relieving the user from laboriously "threading the needle" of a menu hierarchy. Moreover, maintenance of visual "real estate" rendered to the user during flat navigation, e.g., remaining in full screen view 655 during L3 browsing, or thumbnails 650 during L2 browsing, more efficiently presents information to the user than conventional "up-and-down" hierarchical browsing. Flat navigation is useful for websites with multiple levels of webpages and other resources both because it saves the user time and effort, and because the concomitant reduction in resource accesses reduces server-side load.

In a filtered set of pages (e.g. of Windows™ machines or alarms), a user may make decisions during flat navigation to eliminate some of the pages/alarms to arrive at a root cause or an alarm of interest. For example during flat navigation of a set of ten alarms by traversing from the first alarm to the tenth alarm, alarms that are not so critical may be cleared/removed using a gesture (e.g., a downward swipe on a touch screen), a mouse click, a key, or keyboard combination (e.g. Alt Key+C). More generally, while navigating a filtered set (e.g. at a top/higher level) using flat navigation mechanism to view details (e.g. at a second/lower level) of the members of the filtered set, a user can easily remove a member of the filtered set to narrow the inquiry.

In an example use case, assume an outage at a data center. An administrator might look at the view of FIG. 1 to figure out what went wrong. The administrator may need to see the firewall configuration for a subset of items 105. The items of interest may still be manifold. Flat navigation allows the administrator to quickly flip through the item details for the subset of interest, much like flipping through pages in a book. The filter can be modified as problems are identified or eliminated to further cull the subset of items of interest.

Figure 7:
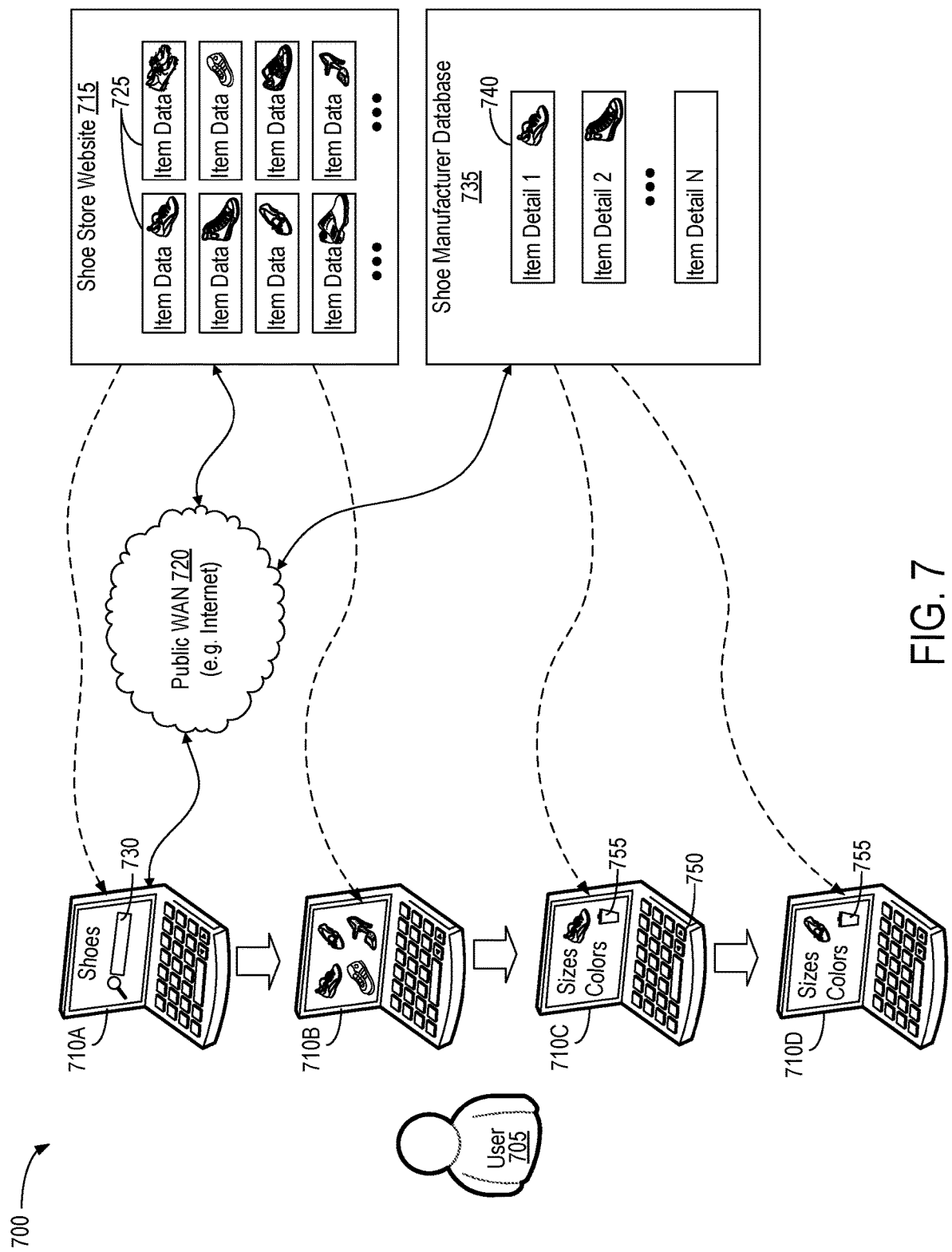
FIG. 7 depicts a system supporting flat navigation in accordance with another embodiment.

FIG. 7 depicts a system 700 that supports flat navigation in accordance with another embodiment. In this example, a user 705 employs a computer 710—shown as four instances 710A-D—to gain access to a shoe-store website 715 via a public network 720. Website 715 maintains a database with a collection of item-data resources 725 that each reference an item, e.g. a type of shoe, or some other product or service.

Computer 710 receives a search query from user 705 via a search field 730. The user might reduce the selection items—shoes—by color, style, or size, for example. In response to the search query, computer 700 presents a results view (710B) derived from the collection of item-data resources 725 from website 715 to depict a subset of the available shoes that meet the search query. The user can obtain additional details about any of the depicted shoes by e.g. selecting one using a touchscreen, touch pad, key, mouse, or voice command. Computer 700 receives this input as an item query identifying one of the subset of items depicted in the results view (710B), and responds by presenting a first item-detail view (710C) derived from the item-detail resource specific to the selected item. In this example, the item detail includes the item variables "sizes" and "colors" that are specific to the selected shoe. In this example, computer 700 obtains this information via an item-detail resource 740 corresponding to the selected shoe and located in a database 735 maintained by a shoe manufacturer. Item-detail resources 740 can include a list of parameters relative to the corresponding item, the parameters including e.g. the variables for sizes and colors, and item-detail resources 740 can be grouped into collections (e.g., womens' shoes, boots, etc.). In other examples, some or all of the item-detail resources 740 are maintained by the shoe store, and may be linked to item-data resources 725 in the manner detailed above in connection with the embodiment of FIGS. 1-6.

Computer 700 includes arrow keys 750 that allow user 705 to navigate easily between item-detail views without having to return to the view afforded by computer 710 in view 710B. In one embodiment, computer 710 executes client-side software to derive a pair of links from the search query and the current view (e.g., 710C) and associates the left and right arrows with those links. This software can be e.g. a Java™ script served by e.g. store website 715, manufacturer database 735, or a third party for execution by browser client software on computer 710.

When user 705 presses the right arrow 750 while computer 710 is presenting the first item-detail view (710C), computer 710 receives an item-detail query directed to a second of the subset of the items depicted in the results view. Computer 700 replaces the first item-detail view (710C) with a second item-detail view (710D) derived from the item-detail resource specific to the second item of the subset of items that resulted from the search (710B). The view of 710D depicts the same variables as the view of 710C, allowing user 705 to easily compare e.g. the sizes and colors of the shoes of interest without having to navigate via the view of 710B. The left arrow 750 works likewise to present details that relate to the preceding item in the subset of view 710B. A trash icon 755 allows the user to remove the detailed item from the subset of view 710B, and thus from further consideration. The subset can be culled using different selection mechanisms (e.g., keys, key combinations, voice commands, and gestures) in other embodiments.

Flat navigation proceeds in single-item steps (i.e., last item or next item) in the foregoing examples, and can proceed in multi-item steps in other embodiments. For example, the step size can be selected in other embodiments, such as by allowing the user to select a main key/number key combination to step by the number of items, or a main key/alphabet key combination for navigating to an item or items with a name starting with or matching the alphabet key or keys. Moreover, a single key stroke may be equivalent to a finger swipe on a touch screen interface, or a multi-step navigation may be equivalent to an appropriate gesture on a touch screen interface e.g. multiple finger/tap. In another embodiment, navigation to proceed to a next or last item in single or multi-item steps may be effectuated by voice command, e.g., one or more words or phrases.

The forgoing description details some types of systems that would benefit from e.g. flat navigation as that term is used herein. The methods in support of the foregoing embodiments can be implemented on the client side (e.g., on computer 710), on the server side (e.g., at website 715), or using a combination of client-side and server-side hardware and software. Moreover, the item-data and item-detail resources can be stored and hosted by providers of the items of interest, or can be stored and hosted by third parties (e.g., "in the cloud"). Many permutations are available, as will be understood by those of skill in the art.

Figure 8:
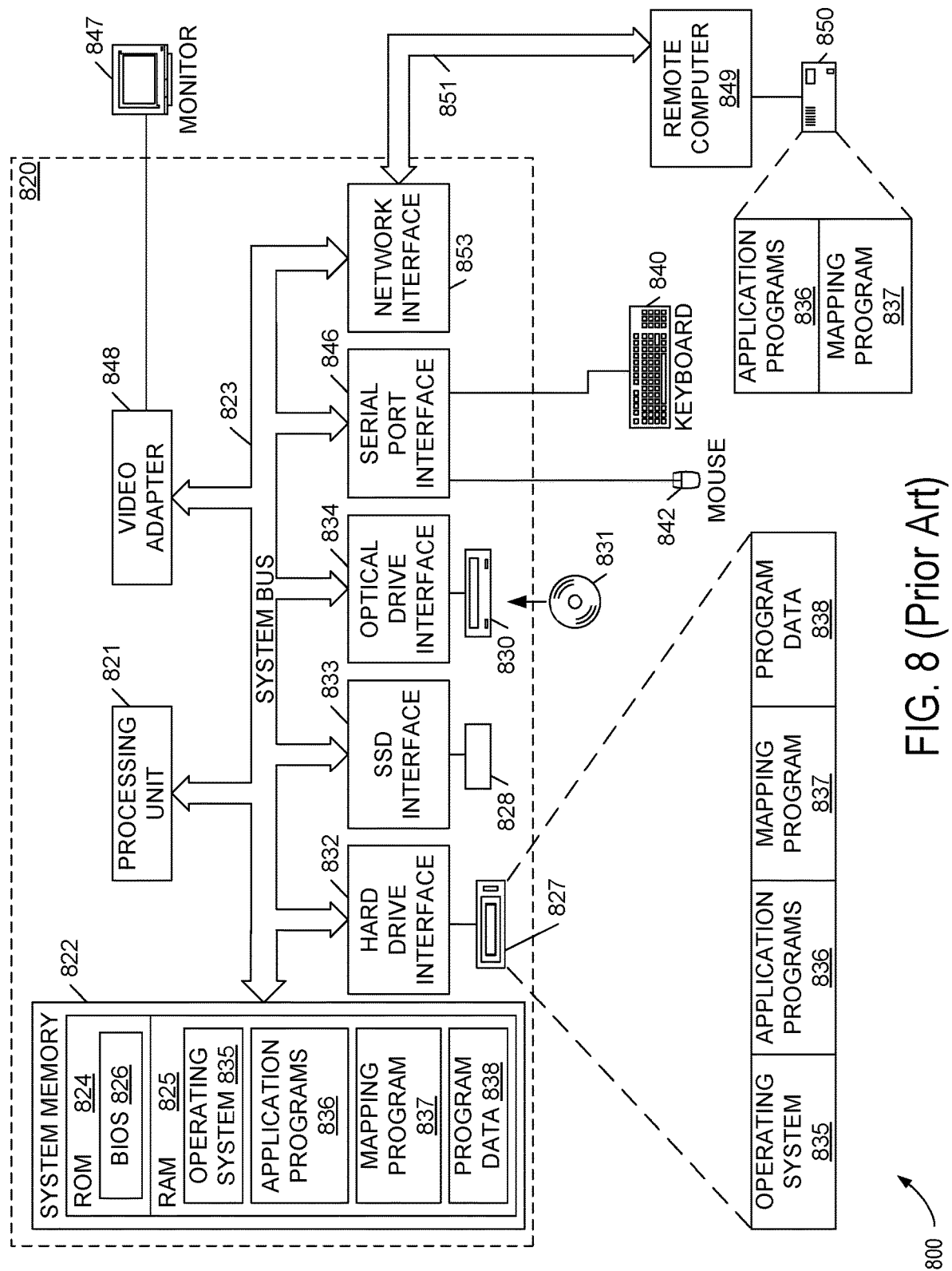
FIG. 8 depicts a suitable prior art computing environment 800 in which the invention may be implemented.

FIG. 8 depicts a general-purpose computing system 800 that can serve as a client or a server depending on the program modules and components included. One or more computers of the type depicted in computing system 800 can be configured to perform operations described with respect to FIGS. 1-7. Those skilled in the art will appreciate that the invention may be practiced using other system configurations, including hand-held devices, multiprocessor systems, microprocessor-based or programmable consumer electronics, network PCs, minicomputers, mainframe computers, and the like.

Computing system 800 includes a conventional computer 820, including a processing unit 821, a system memory 822, and a system bus 823 that couples various system components including the system memory to the processing unit 821. The system bus 823 may be any of several types of bus structures, including a memory bus or memory controller, a peripheral bus, and a local bus using any of a variety of bus architectures. The system memory includes read only memory (ROM) 824 and random access memory (RAM) 825. A basic input/output system 826 (BIOS), containing the basic routines that help to transfer information between elements within the computer 820, such as during start-up, is stored in ROM 824. The computer 820 further includes a hard disk drive 827 for reading from and writing to a hard disk, not shown, a solid-state drive 828 (e.g. NAND flash memory), and an optical disk drive 830 for reading from or writing to an optical disk 831 (e.g., a CD or DVD). The hard disk drive 827 and optical disk drive 830 are connected to the system bus 823 by a hard disk drive interface 832 and an optical drive interface 834, respectively. The drives and their associated computer-readable media provide nonvolatile storage of computer readable instructions, data structures, program modules and other data for computer 820. Other types of computer-readable media can be used.

A number of program modules may be stored on the hard disk, solid state disk 828, optical disk 831, ROM 824 or RAM 825, including an operating system 835, one or more application programs 836, other program modules 837, and program data 838. A user may enter commands and information into the computer 820 through input devices such as a keyboard 840 and pointing device 842. Other input devices (not shown) may include a microphone, joystick, game pad, satellite dish, scanner, or the like. These and other input devices are often connected to the processing unit 821 through a serial port interface 846 that is coupled to the system bus, but may be connected by other interfaces, such as a parallel port, game port or a universal serial bus (USB). A monitor 847 or other type of display device is also connected to the system bus 823 via an interface, such as a video adapter 848. In addition to the monitor, computers can include or be connected to other peripheral devices (not shown), such as speakers and printers.

The computer 820 may operate in a networked environment using logical connections to one or more remote computers, such as a remote computer 849. The remote computer 849 may be another computer, a server, a router, a network PC, a peer device or other common network node, and typically includes many or all of the elements described above relative to the computer 820, although only a memory storage device 850 has been illustrated in FIG. 8. The logical connections depicted in FIG. 8 include a network connection 851, which can support a local area network (LAN) and/or a wide area network (WAN). Such networking environments are commonplace in offices, enterprise-wide computer networks, intranets and the Internet.

Computer 820 includes a network interface 853 to communicate with remote computer 849 via network connection 851. In a networked environment, program modules depicted relative to the computer 820, or portions thereof, may be stored in the remote memory storage device. It will be appreciated that the network connections shown are exemplary and other means of establishing a communication link between the computers may be used.

In the foregoing description and in the accompanying drawings, specific terminology and drawing symbols are set forth to provide a thorough understanding of the present invention. In some instances, the terminology and symbols may imply specific details that are not required to practice the invention. For example, the wireless handheld devices discussed above are "smart phones" that support many services in addition to conventional voice functions. Portable computing devices such as tablet computers, e.g., an iPad manufactured by Apple, Inc. of Cupertino, Calif., and palm-top and lap-top computers, can be equipped as detailed herein to serve as wireless handheld devices. Moreover, some components or devices are shown directly connected to one another while others are shown connected via intermediate components, or wirelessly, e.g., Wi-Fi, Bluetooth, a public WAN, e.g., the Internet, or a cellular network. In each instance, the method of interconnection establishes some desired electrical or logical communication between two or more devices, as will be understood by those of skill in the art.

Shoe Store Website 715 and Shoe Manufacturer Database 735 may be realized as one or more servers, each including one or more elements shown within each, e.g., databases storing item data 725, and item detail 740. Shoe Store Website 715 and Shoe Manufacturer Database 735 may also be implemented as discrete servers in which each includes a processor, memory, storage, and modules, self-contained within a server having discrete physical boundaries. In this embodiment, communications among the processor, memory, storage, and modules, occur internally. A discrete server may also be embodied virtually, e.g., via VMWARE, or VIRTUALBOX. Shoe Store Website 715 and Shoe Manufacturer Database 735 may also be implemented in a distributed fashion, e.g., via a "hypervisor" implementation such as VMWARE, or as individual "cloud" services, in which processor, memory, and storage are not necessarily physically co-extensive. For example, processors may be distributed across several physical processors communicating over a local area network. In such implementations, memory may be physically separate from the processors and databases, requiring communication over a potentially insecure communication link. Some embodiments therefore support secure communication links and data encryption for the communications into and out of Shoe Store Website 715 and Shoe Manufacturer Database 735. The components of Shoe Store Website 715 and Shoe Manufacturer Database 735 may be distributed across local and wide-area networks, including the Internet, as will be readily understood by those of skill in the art. Therefore, the spirit and scope of the appended claims should not be limited to the foregoing description. In U.S. applications, only those claims specifically reciting "means for" or "step for" should be construed in the manner required under 35 U.S.C. § 112(f).

What is claimed is:

1. A computer-implemented method for accessing network resources in a hierarchical structure of nodes having a plurality of levels, the method comprising:
   providing access to a collection of item-data resources at a first level of the hierarchical structure of nodes, each item-data resource referencing an item;
   providing access to a collection of item-detail resources at a second level of the hierarchical structure of nodes, each item-detail resource including an item variable specific to a corresponding one of the items;
   receiving a search query and, responsive to the search query, presenting a results view derived from the collection of item-data resources and depicting a subset of the items, wherein the subset of the items is defined by the search query rather than selected based upon pre-existing criteria;
   receiving an item query identifying a first of the subset of the items depicted in the results view and, responsive to the item query, presenting a first item-detail view derived from the item-detail resource specific to the first item of the subset of items and depicting the item variable specific to the first of the subset of the items, wherein the depicting is in full screen view, such that the item variable to be rendered is to occupy a full display screen visible to a user; and
   receiving, while presenting the first item-detail view, an item-detail flat navigation request employing a main key/alphabet key combination for navigating to an item or items with a name starting with or matching the alphabet key or keys and directed to a second of the subset of the items and, responsive to the item-detail flat navigation request, replacing the first item-detail view with a second item-detail view derived from the item-detail resource specific to the second item of the subset of items and depicting the item variable specific to the second of the subset of the items, wherein the depicting is in full screen view, such that the item variable specific to the second of the subset of the items is to occupy the full display screen, and the flat navigation request is configured to initiate navigation to a node that is limited to the subset of the items and the second level of the hierarchical structure of nodes, wherein the second level is the lowest level of the hierarchical structure of nodes, the first item-detail view contains a first item-specific image and the second item-detail view contains a second item-specific image.

2. The method of claim 1, wherein at least one of the collection of item-data resources and the collection of item-detail resources comprise hypertext documents.

3. The method of claim 1, wherein the items comprise at least one of products and services.

4. The method of claim 1, wherein each item-detail resource includes a list of item parameters.

5. The method of claim 1, wherein each item-data resource includes a link to the corresponding item-detail resource.

6. The method of claim 1, wherein each item-detail resource lacks a link to the other item-detail resources.

7. The method of claim 6, further comprising deriving, from the search query, a link to the item-detail resource specific to the second item of the subset of items and activating the link responsive to the item-detail flat navigation request.

8. The method of claim 1, wherein depicting the subset of the items comprises presenting a list of the subset of the items.

9. The method of claim 1, wherein the search query limits the results view to one of multiple categories of item-data resources in the collection of item-data resources.

10. The method of claim 1, wherein the search query limits the results view based on a character string.

11. The method of claim 1, further comprising, responsive to a command and prior to receiving a second item-detail flat navigation request, removing the second of the subset of the items from the subset of the items.

12. A system for accessing network resources in a hierarchical structure of nodes having a plurality of levels, the system comprising:
one or more computers configured to perform operations including:
providing access to a collection of item-data resources at a first level of the hierarchical structure of nodes, each item-data resource referencing an item;
providing access to a collection of item-detail resources at a second level of the hierarchical structure of nodes, each item-detail resource including an item variable specific to a corresponding one of the items;
receiving a search query and, responsive to the search query, presenting a results view derived from the collection of item-data resources and depicting a subset of the items, wherein the subset of the items is defined by the search query rather than selected based upon pre-existing criteria;
receiving an item query identifying a first of the subset of the items depicted in the results view and, responsive to the item query, presenting a first item-detail view derived from the item-detail resource specific to the first item of the subset of items and depicting the item variable specific to the first of the subset of the items, wherein the depicting is in full screen view, such that the item variable to be rendered is to occupy a full display screen visible to a user; and
receiving, while presenting the first item-detail view, an item-detail flat navigation request employing a main key/alphabet key combination for navigating to an item or items with a name starting with or matching the alphabet key or keys and directed to a second of the subset of the items and, responsive to the item-detail flat navigation request, replacing the first item-detail view with a second item-detail view derived from the item-detail resource specific to the second item of the subset of items and depicting the item variable specific to the second of the subset of the items, wherein the depicting is in full screen view, such that the item variable specific to the second of the subset of the items is to occupy the full display screen, and the flat navigation request is configured to initiate navigation to a node that is limited to the subset of the items and the second level of the hierarchical structure of nodes, wherein the second level is the lowest level of the hierarchical structure of nodes, the first item-detail view contains a first item-specific image and the second item-detail view contains a second item-specific image.

\* \* \* \* \*